United States Patent
Groff et al.

(10) Patent No.: US 6,450,796 B1
(45) Date of Patent: Sep. 17, 2002

(54) ROTATING NOZZLE DIE MACHINE FOR DOUGH EXTRUSION

(75) Inventors: E. Terry Groff, Wernersville; Joseph S. Zaleski, Jr., Mohrsville; Kevin G. Knott, Sinking Spring; Vincent G. Pasquini, Hershey; Steven W. Shepler, Myerstown; Brett A. Riegel, Robesonia, all of PA (US)

(73) Assignee: Reading Bakery Systems, Robesonia, PA (US)

( * ) Notice: Subject to any disclaimer, the term of this patent is extended or adjusted under 35 U.S.C. 154(b) by 0 days.

(21) Appl. No.: 09/599,635

(22) Filed: Jun. 22, 2000

Related U.S. Application Data
(60) Provisional application No. 60/143,572, filed on Jul. 13, 1999, and provisional application No. 60/165,566, filed on Nov. 15, 1999.

(51) Int. Cl.[7] .............................. A23P 1/12; B29C 47/08
(52) U.S. Cl. .................. 425/192 R; 425/319; 425/381; 425/382 R; 425/464
(58) Field of Search .............................. 425/190, 192 R, 425/319, 381, 391, 464, 466, 467, 382 R

(56) References Cited

U.S. PATENT DOCUMENTS

| | | | |
|---|---|---|---|
| 1,714,234 A | * 5/1929 | Ost | |
| 2,199,825 A | * 5/1940 | Kretchmer | |
| 2,856,868 A | * 10/1958 | Kennedy | |
| 4,288,463 A | 9/1981 | Groff et al. | 426/500 |
| 4,445,838 A | * 5/1984 | Groff | |
| 5,492,706 A | * 2/1996 | Cockings et al. | |
| 5,670,185 A | * 9/1997 | Heck et al. | |

* cited by examiner

Primary Examiner—Robert Davis
Assistant Examiner—Joseph Leyson
(74) Attorney, Agent, or Firm—Akin, Gump, Strauss, Hauer & Feld, L.L.P.

(57) ABSTRACT

A rotary drive die nozzle machine for an extruder comprises at least one rotatable nozzle having at least three openings. A compression head directs food material from the extruder toward at least one rotating nozzle. A drive assembly including at least one drive gear rotates the at least one nozzle. The at least one nozzle is axially removable from the drive gear to allow replacement with nozzle openings of different sizes and shapes. The machine includes a series of seals to prevent the extruded food product from getting into the drive assembly and to prevent grease and other matter from the drive assembly from getting into the food material.

3 Claims, 6 Drawing Sheets

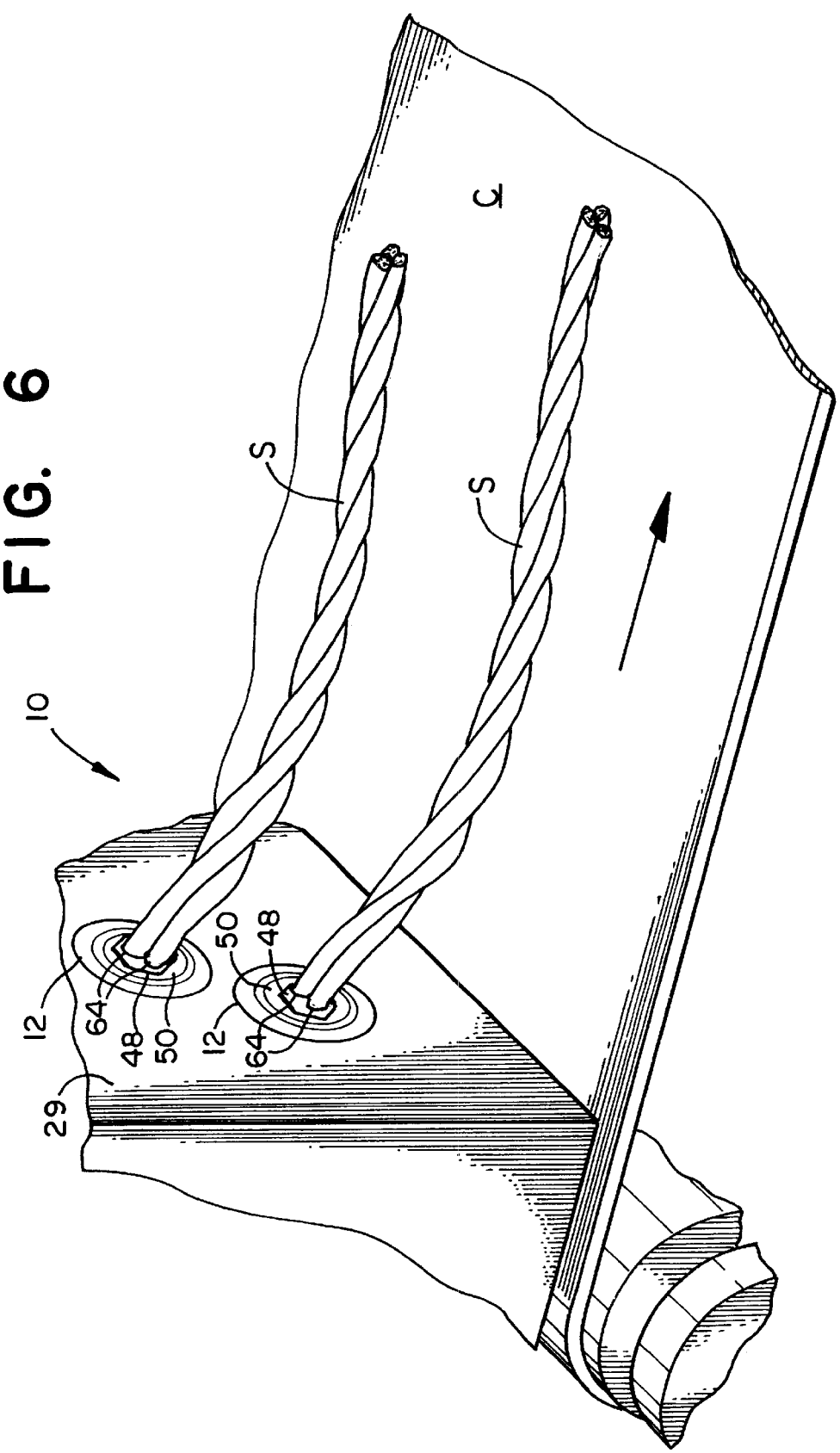

ROTATING NOZZLE DIE MACHINE FOR DOUGH EXTRUSION

CROSS REFERENCE TO RELATED APPLICATIONS

The present application claims the benefit of U.S. Provisional Application No. 60/143,572, filed Jul. 13, 1999 and entitled, "Rotating Nozzle Die for Dough Extrusion, Process for Producing Twisted Laminated Dough Product and Product" and U.S. Provisional Application No. 60/165,566, filed Nov. 15, 1999 and entitled, "Rotating Nozzle Die for Dough Extrusion, Process for Producing Twisted Laminated Dough Product and Product" the subject matter of both of which is hereby incorporated herein by reference.

BACKGROUND OF THE INVENTION

The present invention relates to a rotary nozzle die machine for a dough extruder for producing a twisted dough product. More particularly, the invention relates to a rotary nozzle die arrangement for extruding dough through at least three openings with the rotating nozzle twisting the dough together to form a twisted dough product having qualities similar to a conventional laminated dough product, such as a cracker.

The only known prior rotating nozzle die machine for a dough producing arrangement was used for producing a spiral wound or braided pretzel product and is described in U.S. Pat. No. 4,288,463, which is hereby incorporated herein by reference. An extrusion die machine utilizing rotary nozzles, with each nozzle having two openings through which dough was extruded as the nozzle was turned, was used to form the spiral wound pretzel dough product. Based upon the vertical distance from the extrusion head to the conveyor belt and the speed of the conveyor belt, the pitch of the spiral wound dough product was varied to a desired configuration. However, in the prior known apparatus, pressures of at least 100 psi were generally required in order to force the dough through the extrusion head and out through the openings in the rotating nozzle. While such pressures could be generated in an extruder, it only allowed the use of certain types of dough formulations containing very low protein. Thus, the prior arrangement did not allow the use of a soft texture dough, such as the type of dough used in cracker products since the high extrusion pressure caused damage to the starch and gluten chains within such dough. Accordingly, the prior known arrangement was only usable with a heavier pretzel dough.

The sealing of the dough from the rotary mechanisms within the die plate of such machines is critical to creating a machine that is both sanitary and capable of operating substantially continuously without significant operator intervention. Standard sealing methods, such as those employed in the prior art apparatus, were susceptible to the abrasiveness of the dough and the high pressures necessary to extrude the dough. Such conventional sealing arrangements often failed prematurely and did not work well due to the high viscosity of the dough and the need to have all of the seals and all other "wetted" parts sanitary in their construction, which is required by the food processing industry. The mechanical seal arrangement in the prior apparatus which was intended to prevent dough from entering the bearings that support the rotating nozzles would often fail after a relatively short period of use, requiring the entire extrusion head to be disassembled, cleaned and rebuilt. This involved a time consuming tear down of the equipment during which time the production line was idled.

It would be desirable to provide an extrusion die apparatus having at least three rotating nozzles with a streamlined arrangement to allow extrusion of dough at lower pressures. It would also be desirable to provide an improved sealing arrangement in such an apparatus to prevent the migration of dough into the bearings or other components which support the rotating nozzles in order to diminish or eliminate the need for time consuming tear downs of the rotary nozzle extrusion die for clean out and rebuilding upon seal failure. It would also be desirable to provide a new and unique snack product having a laminated texture utilizing a more efficient manufacturing method.

SUMMARY OF THE INVENTION

The present invention comprises a rotating nozzle die machine with an improved seal arrangement in order to prevent dough ingress to a nozzle support bearing. The sealing arrangement utilizes a multi-stage seal including at least one seal with at least one but, preferably a plurality of direction changes of at least 90° which prevent dough ingress by requiring higher pressures than available through the extrusion system in order to force the dough to overcome the directional changes to pass through the seal.

In another aspect, the present invention comprises a rotary nozzle die machine with a rotating nozzle having three or more openings. The die and the nozzle have a streamlined dough passageway in order to reduce extrusion pressure to less than 100 psi to prevent damage to the gluten structure of the dough to be extruded. The rotating nozzle produces three or more distinct dough streams and the rotation of the nozzle creates a laminating effect by spirally winding the streams of dough together into one continuous piece creating a laminated texture gradient within the product.

In another aspect, the present invention provides a food product having a laminated texture formed by a rotary laminating process in which three or more strands of dough are extruded through a rotating nozzle and are spirally wound or twisted together prior to being baked.

BRIEF DESCRIPTION OF THE SEVERAL VIEWS OF THE DRAWINGS

The foregoing summary, as well as the following detailed description of a preferred embodiment of the invention, will be better understood when read in conjunction with the appended drawings. For the purpose of illustrating the invention, there is shown in the drawings an embodiment which is presently preferred. It should be understood, however, that the invention is not limited to the precise arrangements and instrumentalities shown. In the drawings:

FIG. 6 is a perspective view of a portion of the machine of FIG. 1 showing the dough strands being spirally wound.

DETAILED DESCRIPTION OF THE INVENTION

Figure 1:
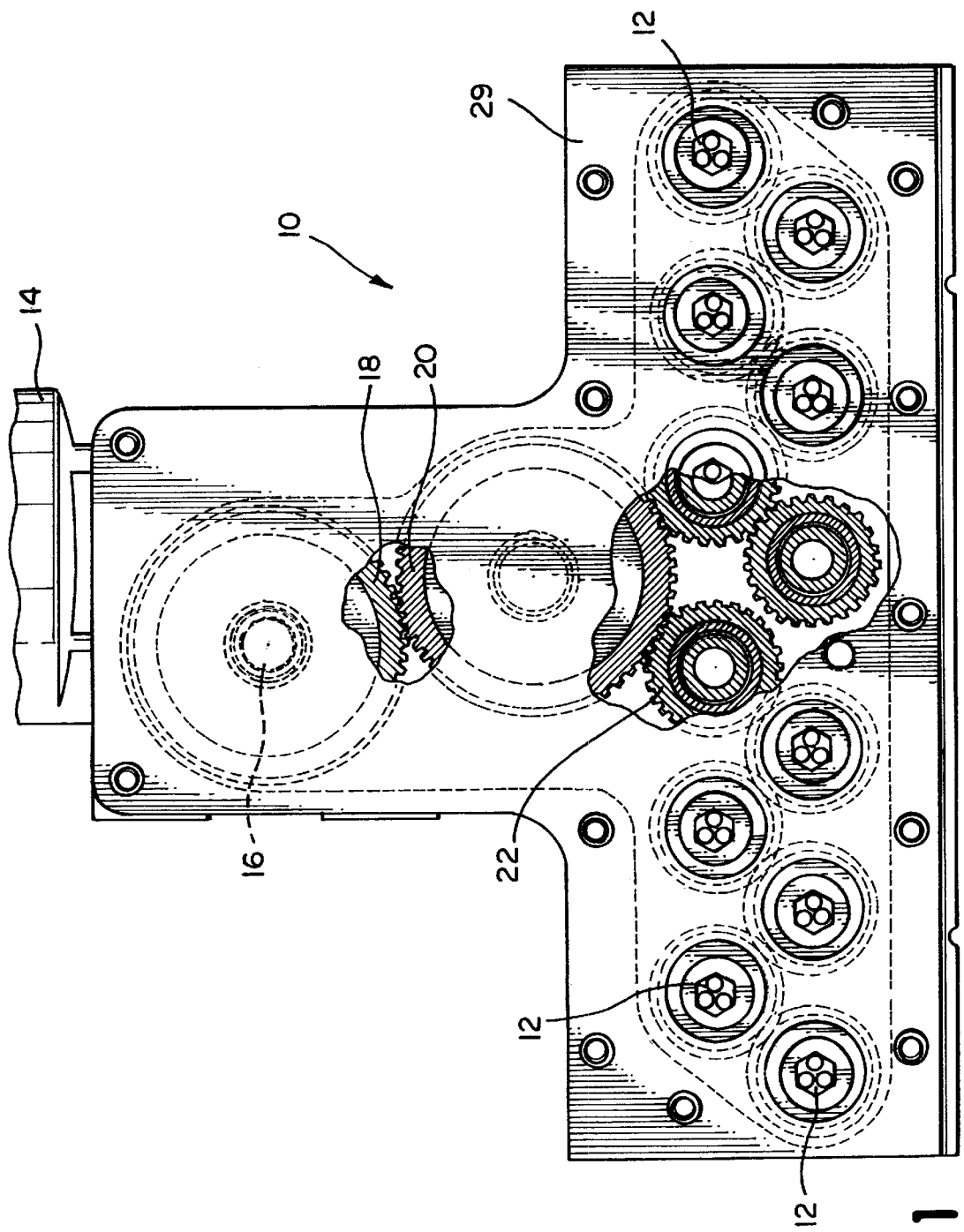
FIG. 1 is a front elevational view, partially broken away, of an extruder die machine having a plurality of rotating nozzles arranged therein in accordance with a preferred embodiment of the present invention.

Certain terminology is used in the following description for convenience only and is not limiting. The words "right," "left," "lower" and "upper" designate directions in the drawings to which the reference is made. The words "inwardly" and "outwardly" refer to directions toward and away from, respectively, the geometric center of the rotary nozzle die machine in accordance with the present invention and designated parts thereof. The terminology includes the words above specifically mentioned, derivatives thereof and words of similar import.

Referring now to FIGS. 1–5, a rotary nozzle extruder die machine 10 having at least one rotating nozzle 12 is provided. The machine 10 is preferably used in conjunction with an extruder (not shown), such as a Dough Forming Extruder which is available from Reading Bakery Systems, the assignee of the present invention. Generally, in the extruder, dough is carried by the one or more augers from a feed hopper to a compression head 26. The compression head 26 typically employs a die plate having one or more metering holes arranged in a desired shape or pattern through which the dough is forced. The shape of the dough extruded out through the holes corresponds to the shape or pattern of the holes. It will be recognized by those skilled in the art that the present extruder die machine 10 with rotating nozzles 12 can be used in conjunction with other types of dough extruding equipment which take food dough and apply pressure to the dough preferably using one or more augers.

In the rotary nozzle extruder die machine 10, the nozzles 12 are easily replaceable and are fully interchangeable such that different shapes of dough may be extruded. Additionally, any wheat, potato, corn or soy based flour dough or any other dough can be processed through the die machine 10 with the pressure on the dough being maintained within the a range of 20 to 250 psi, although low pressures of 80 psi or less provide a suitable processing pressure for many doughs without damaging the dough structure in order to form a novel laminated texture twisted food product in accordance with the present invention.

As shown in FIG. 1, in the preferred embodiment of the machine 10, twelve offset rotating nozzles 12 are provided in order to allow the simultaneous extrusion of twelve streams of dough, each including a plurality of spirally wound or twisted strands. The twelve nozzles 12 are all rotated by a single drive system comprising a motor 14, preferably a controllable variable speed electric motor, which is connected by a shaft 16 to a pinion gear 18. The pinion gear 18 engages a gear train having a primary drive gear 20 that intermeshes with two separate gear trains of intermeshing nozzle drive gears 22 each of which in turn rotate an individual rotating nozzle 12. However, it will be recognized by those skilled in the art from the present disclosure that various numbers and configurations of rotating nozzles 12 can be utilized, if desired, and the drive train may be varied to employ any other suitable arrangement of gears, toothed belts and pulleys or other suitable drive means for the purpose of causing one or more of the individual nozzles 12 to rotate at a desired speed to provide the twisted dough strands.

Figure 2:
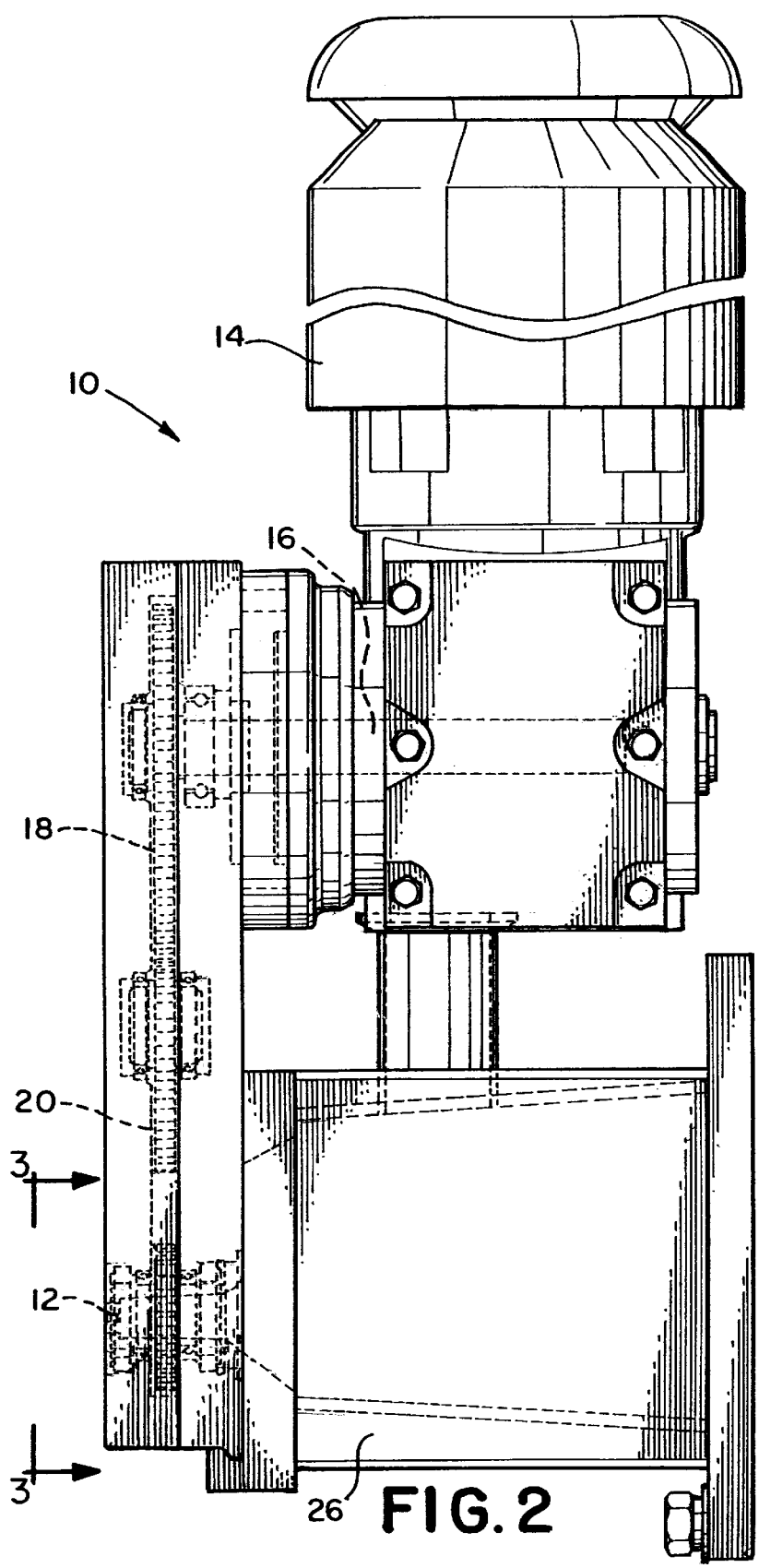
FIG. 2 is a side elevational view of the machine of FIG. 1.
Figure 4:
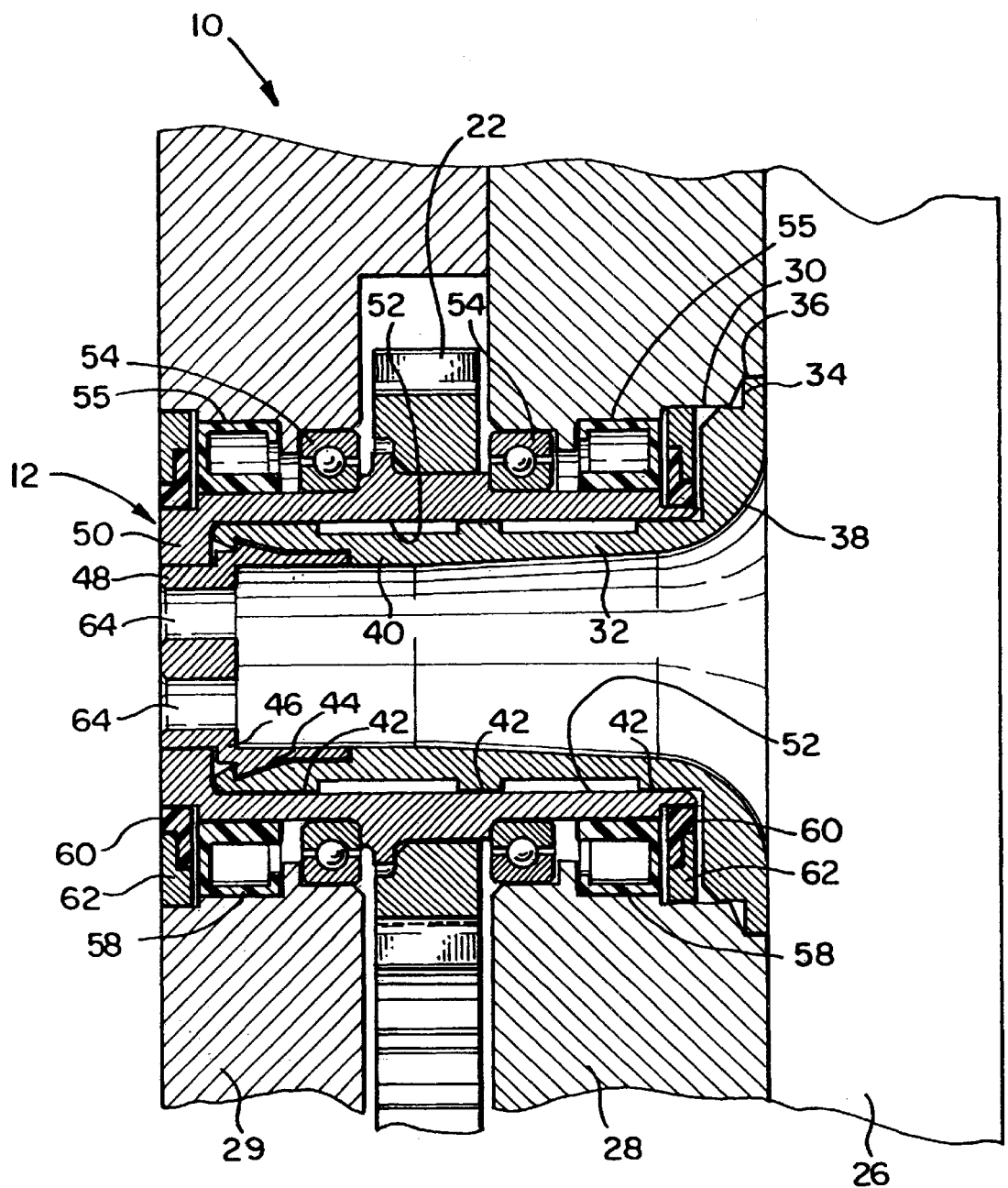
FIG. 4 is a cross-sectional of a portion of one of the rotating nozzle arrangements taking along line 4—4 of FIG. 3.

As shown in detail in FIGS. 2 and 4, the rotating nozzle extruder die machine 10 also includes a compression head 26 which channels dough from the extruder to a machined mounting plate 28 which receives the first ends of the rotating nozzles 12. A cover plate or outer cover 29 is provided on the outer surface of the machine 10. The mounting plate 28 and the cover plate 29 together form a housing for receiving and retaining the other components as will hereinafter be described. The mounting plate 28 includes a plurality of openings 30 (only one being shown in FIG. 4) which can be of various sizes and spacings, depending upon the product to be produced.

Figure 3:
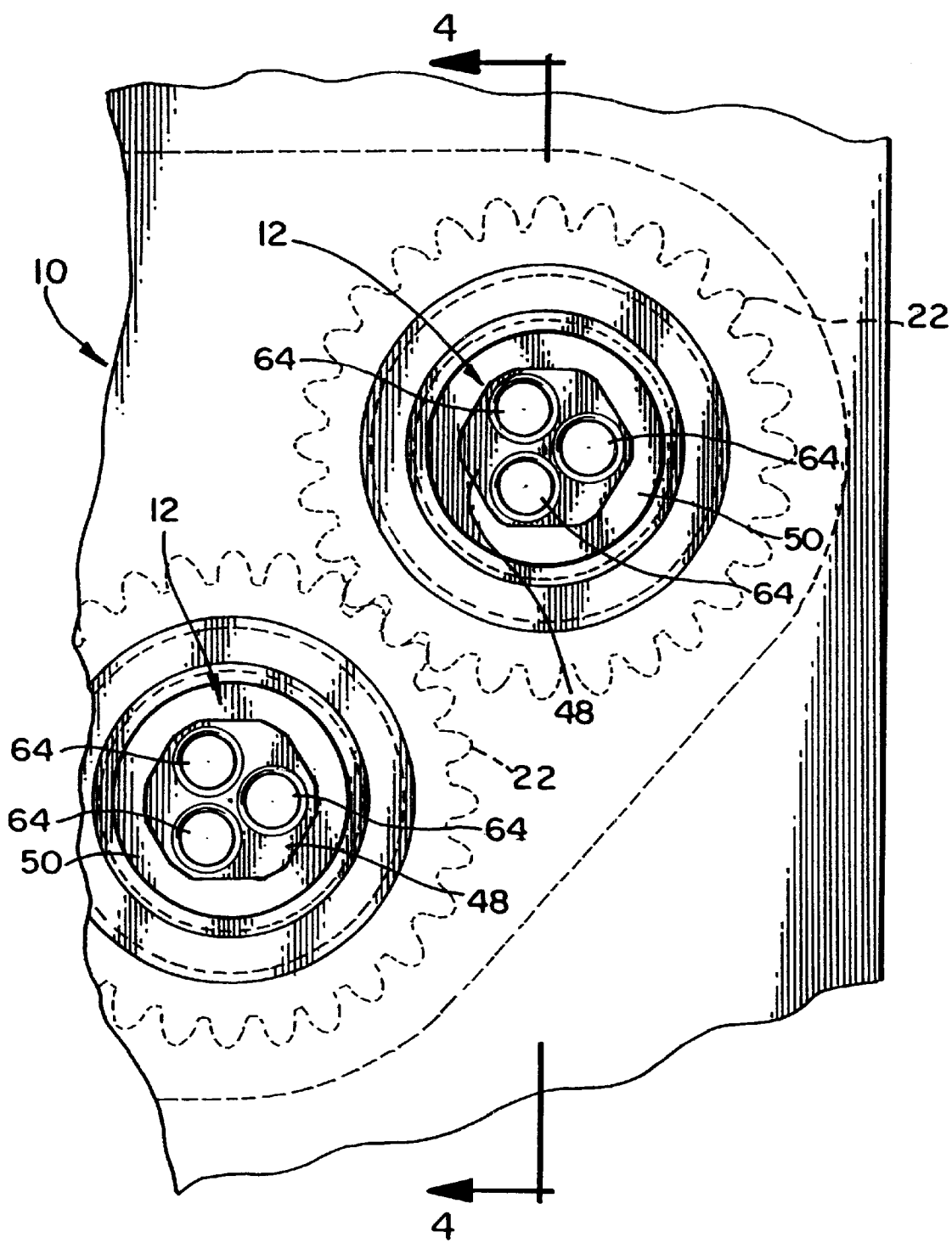
FIG. 3 is an enlarged cross-sectional view of a portion of the machine taking along line 3—3 of FIG. 2.
Figure 5:
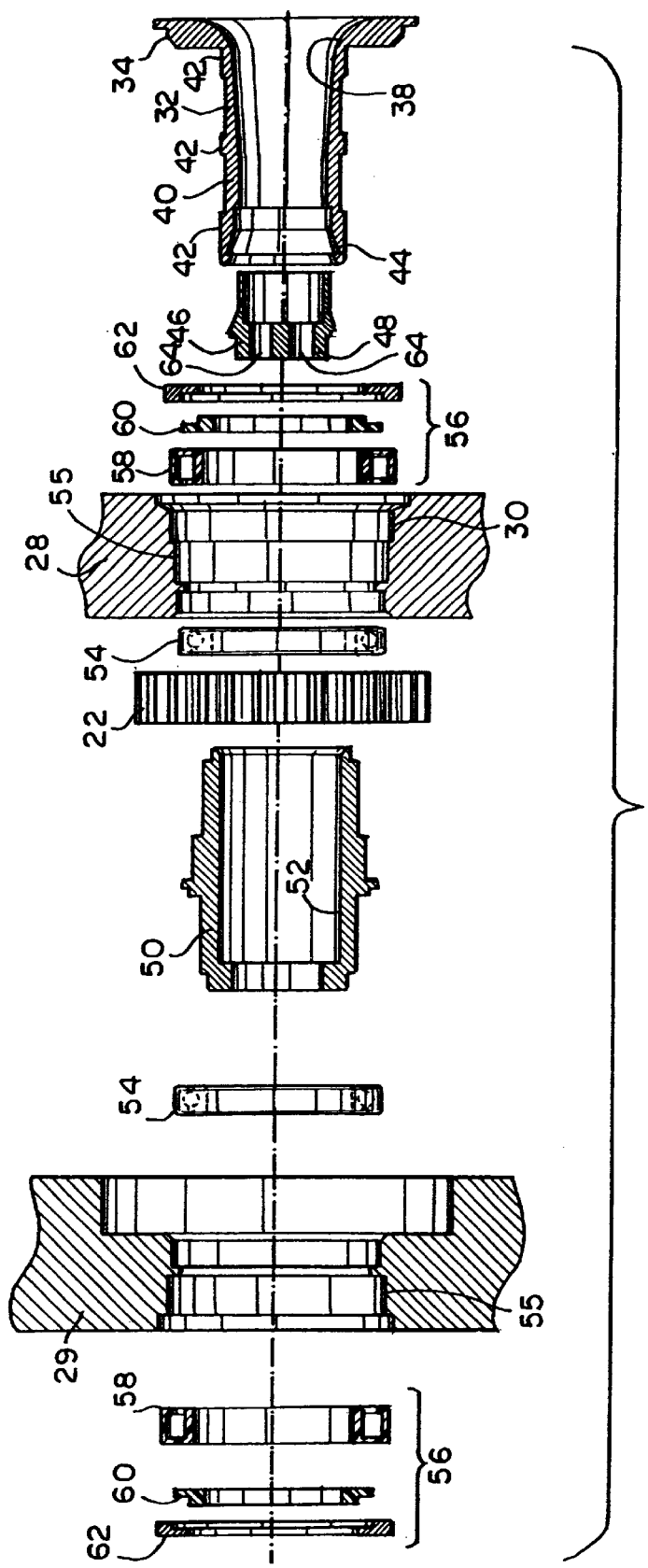
FIG. 5 is an exploded view, partially in cross-section, of the components which makeup the rotating nozzle die shown in FIG. 4.

As shown in FIGS. 3–5, each rotary nozzle assembly 12 includes a stationary sleeve 32 that is pressed into the mouth of the opening 30 in the mounting plate 28. The stationary sleeve 32 includes a first end with an annular stepped seating surface 34 which is engaged with a corresponding annular stepped recesses 36 in the mounting plate 28. The first end of the sleeve 32 also includes an infeed cone 38 for receiving a flow of dough from the extruder. The sleeve 32 has a generally tubular body portion 40 that extends through almost the entire depth of the mounting plate 28 and the outer cover 29. The infeed cone 38 and the tubular body portion 40 of the stationary sleeve 32 are designed to reduce pressure and friction which could cause damage to certain types of dough structure. Dough flows in chambers due to pressure. The pressure must be high enough to force the dough through the nozzle openings, but low enough to protect the gluten structure within the dough from the altering forces of high pressure. In order to force the dough through the nozzles 12, a minimum pressure of about 20–30 psi is required utilizing the present rotary nozzle die machine 10. The prior known design required a pressure of over 100 psi which made the gluten structure of grain based dough susceptible to damage. Some doughs, such as corn or potato based dough, can withstand high pressures of 200 psi or higher. Accordingly, the nozzles 12 while operable at pressures as low as 20 psi must also be able to withstand higher pressures of up to 250 psi depending upon the dough being used. However, for grain based dough, operation at pressures of 80 psi or lower are preferred and attainable utilizing the present rotary nozzle die 10.

When dough starts to flow, the pressure is decreased because the flow has some inertia. The required pressure to push flowing dough is much less than the static pressure to start the dough moving. Accordingly, the nozzles 12 and the path from the extruder to the nozzle openings are as streamlined as possible in order to keep the pressure low to avoid adversely affecting the dough by breaking down the gluten structure. The elimination of directional changes and interfering surfaces is therefore critical to achieving lower pressure extrusion. If the directional changes are significant, the velocity pressure and inertia forces of the dough are lost.

Three spaced annular ridges 42 are provided on the outer surface of the tubular body portion 40 to act as seals in a manner which will hereinafter become apparent. The tubular body portion 40 further includes an annular recess 44 inside of the second or distal end, the recess 44 having a profile designed for axial locking engagement with a rotatable nozzle 46 as hereinafter described.

The rotatable nozzle 46, which includes a complementary shaped engaging portion on the outer surface is connected to the annular recess 44 of the stationary sleeve 32 with a snap connection which prevents relative axial movement while still allowing rotary movement of the rotatable nozzle 46 with respect to the stationary sleeve 32. As shown in FIGS. 3 and 4, a hexagonal portion 48 on the distal end of the rotatable nozzle 46 protrudes from the tubular body portion 40 and is engaged within a corresponding hexagonal opening in a tubular drive sleeve 50, which is rotatably mounted around the outside of the stationary sleeve 32. Those skilled in the art will recognize that this connection need not be hexagonal, but could be any other suitable form or shape, which locks together the rotatable nozzle 46 and the drive sleeve 50 for concurrent rotation. The inside surface 52 of the drive sleeve 50 contacts each of the three annular ridges 42 to form three seals. The nozzle drive gear 22 is fixedly mounted (preferably with a press or keyed fit) on the outer surface of the drive sleeve 50. The drive sleeve 50 is rotatably supported by two sets of bearings 54 which are pressed into the mounting plate 28 and cover 29, respectively on both sides of the drive gear 22.

A pair of seal assemblies 56 are located on the axial outer sides of the each of the bearings 54 to prevent the ingress of dough or other material into the bearings 54 and to prevent lubricants in the gear area and/or bearings 54 from leaking outwardly. Each seal assembly 56 is comprised of an annular seal ring 58 which faces or abuts the respective bearing 54 within an annular seal gland 55 within the mounting plate 28 or cover 29, a first or inner annular cover or back-up ring 60 which abuts the seal ring 58, and a second or outer cover ring 62 which abuts and contains the inner cover ring 60. The annular seal ring 58 is generally C-shaped in cross-section and is preferably made of a soft elastomeric material such as those well known in the seal art. The inner cover ring 60 is made of a high strength polymeric material such as PEEK or some other such material well known in the seal art. The outer cover ring 62 is preferably made of metal, such as a steel alloy and includes an annular lip which engages a complimentary lip on the inner cover ring 60 to retain the inner cover ring 60 in place as shown on FIG. 4. The outer cover ring 62 is held in place within an annular recess within the outer surface of the mounting plate 28 outer cover 29 by a press or interference fit. In this manner the drive sleeve 50 rotates with respect to the sealing surfaces of the seal ring 58 and the inner cover 60.

Preferably, the stationary sleeve 32, the rotatable nozzle 46 and the drive sleeve 50 are all made of a food safe, high strength polymeric material to further reduce friction created as the dough is extruded. However, other suitable food sanitary materials, such as stainless steel, may be utilized if desired. The rotatable nozzle 46 preferably includes three generally circular openings 64. However, the number of openings 64 can be varied, if desired, depending upon the dough material being utilized and the type of product to be produced. Additionally, different rotatable nozzle openings 64 having different opening configurations and/or sizes can be snapped into the annular recesses 44 in the stationary sleeves 32, if desired. This is accomplished by removing the stationary sleeve 32 from the driving sleeve 50, and then snapping out the rotatable nozzle 46 and replacing it with another utilizing the snap connection.

Preferably the mounting plate 28, cover plate or cover 29 and the drive gears 22 are each made of a high strength metal such as steel. The bearings 54 are preferably ball or roller bearings and are of a type well known in the art.

The rotating nozzle assemblies 12 as shown include three separate stages of sealing for the rotating parts to prevent the ingress of dough into the gear area. The first stage is provided by a serpentine path including multiple directional changes of at least 90° established by the annular recess 44 in the stationary sleeve 32 and the complementary shaped engaging portion on the outer surface of the rotatable nozzles 46. Directional changes in a dough stream require significant pressure. In a direction change, the velocity pressure and inertia forces of the dough are lost. Pressure must build in the form of static pressure before a dough starts to move again in the different direction. If the extrusion system cannot build up high enough pressure, the dough will stagnate and not move. The pressure that the extruder generates is then dissipated in overcoming all of the frictional forces at work. By creating a path with multiple direction changes, significant pressure drops are created where the dough loses its inertia and velocity and stagnates. The pressure then forces the dough to flow along a path of less resistance in this case through the nozzle 46 and out the nozzle openings 64. The dough stagnates around the first stage seal but does not pass through it. In the preferred arrangement, the dough would be required to make three 90° turns to pass through the first stage seal. However, it will be recognized by those skilled in the art from the present invention that other arrangements could be utilized, such as a different serpentine path or other multi-directional change configuration. In all testing carried out to date, dough has never traveled past the first stage seal.

The second stage seal is provided by the three annular ridges 42 on outer surface of the stationary sleeve 32 which contact and engage the inner surface 52 of the drive sleeve 50. This seal stage has multiple, spaced apart seal areas based on the spaced apart locations of the annular ridges 42. Additionally, the number of annular ridges 42 can be varied to provide additional sealing effectiveness, if necessary.

The third stage seal is established by the seal assemblies 56 which generally cannot be reached by the dough stream under any conditions. The seal assemblies 56 also act as a good seal to prevent lubricants from the gear area and the bearings 54 from moving back toward the dough area.

The three stage seal arrangement of the rotating nozzle rotary nozzle extruder die machine 10 provides increased reliability and solves the problems of past conventional seal designs in which dough would bypass the known mechanical seals and work into the gear box, requiring shut down and rebuilding of the equipment.

The rotating nozzles 46 have an advantage in that the dough travels through the smooth stationary sleeve 32 for most of its path until reaching the rotating nozzle 46, which provides a very short distance between the point where the dough stream is subject to rotary motion of the rotating nozzle 46 prior to being forced through the openings 64 thereby significantly, reducing the amount of shearing forces that the dough is subjected to during the extrusion process. The rotary nozzle extruder die machine 10 with rotating nozzles 12 provides the ability to form a variety of spiral wound food products with unique and different textures due to the low extrusion pressure required and the laminating effect caused by spiral winding of dough strands extruded at lower pressures. Additionally, the extruder die machine 10 is more reliable due to the three stage seal arrangement and is capable of operating for an extended time period without intervention on a continuous basis, providing lower operating costs.

By utilizing the rotating nozzle die machine 10 with a dough pressure of less than 80 psi in connection with a nozzle 46 having at least three openings 64, a unique twisted food product having a laminated texture can be formed in an efficient and reliable manner. Conventional laminating processes used in making certain types of crackers require sheeting and forming equipment which are known in the cracker producing industry. When dough is extruded, gluten strands align in the extrusion direction. When these strands are positioned in alternating patterns to each other, the product has a lamination type texture similar to that found in the cracker process. The main difference is that the present twisted food product includes strands that are rotary formed in comparison to the sheeting, stacking and cutting of the conventional cracker lamination process. The sheet and cut approach is the standard approach to laminated cracker products. However, utilizing the rotary nozzle die machine 10 in connection with an extruder provides a similar laminated texture effect with a much more economical process. The use of at least three strands of dough creates a product having a texture that is light and airy and very similar to a laminated cracker. The laminar flow of the nozzle 46 and low extrusion pressures employed create a distinctive spiral lamination.

Dough is loaded into the extruder and forced into the compression head 26 and into the rotary nozzle die machine 10. The dough enters the rotating nozzles 12 which are driven via the motor 14 acting on the nozzle drive gears 22 through the gear drive train described above. The dough is forced through the nozzle openings 64 in each of the nozzles 12 as a plurality of dough strands S (see FIG. 6) that are spiral wound, twisted or braided, preferably from three or more dough strands. The spiral wound dough from each nozzle 46 is deposited on a conveyor C, is cut into segments or pieces using a standard guillotine cutter (not shown), and is then proofed and baked. The proofing and baking steps are dependent upon the particular dough mixture, conveyor speed, room temperature, oven temperature, as well as other factors, and accordingly will not be described in detail herein. The resulting product may be produced as a laminated spiral stick or nugget or as a flat cracker, the round spiral cross-section having been flattened, for example, by a roller (not shown) to produce the cross-section associated with flat crackers.

The shape and design of the nozzle openings 64 are specific to the type of dough and the process. When distinct openings 64 are created in the second end or tip of the nozzle 12 such that the dough strands extruding from each of the holes are separate, the product forms a laminated type of bond when three or more openings 64 are provided. This creates a uniqueness in product texture when three or more strands S couple together as shown in FIG. 6. As the multiple strands of dough are extruded, the surface of each strand has a chance to dry before the action of the rotating nozzle 64 causes the strands to bond together. The drying of the surface of each strand creates a skin on the individual dough strands that helps to create the texture gradient in the resulting product. The faster the nozzles 12 are rotated, the more of a textural gradient is created. The speed of rotation of the nozzles 12 can be controlled by the variable speed motor 14.

Surface texture is also a function of nozzle opening design. The design of the openings must account for the open area of the product extruded and the length of the shape machined in the openings of the nozzle 12. The depth of the machining, sometimes referred to as the "land" area is critical to forming a laminar flow within the dough. If the dough does not achieve a laminar flow, the dough tends to peel back at the nozzle exit, ruining the product's surface texture. This is important when trying to rotary bond one dough strand to another. The land depth is typically at least as long as the width or diameter of the opening of the shape cut or machined on the nozzle end.

It will be appreciated by those skilled in the art that changes can be made to the embodiments described above without departing from the broad inventive concept of the invention. It will be similarly understood that the rotary nozzle die can be used in other food applications. It is understood, therefore, that this invention is not limited to the particular embodiments disclosed, but it is intended to cover modifications within the spirit and scope of the present invention.

What is claimed is:

1. A rotary drive nozzle die machine for an extruder comprising:

at least one rotatable nozzle having a plurality of openings;

a compression head for directing food material from the extruder to the at least one rotatable nozzle;

a drive assembly including at least one drive gear for rotating the at least one nozzle;

the at least one nozzle being axially removable from the drive gear to allow replacement of the nozzle with another nozzle having openings of differing shapes and sizes; and a rotary seal between the at least one nozzle and a housing in which the at least one nozzle rotates, the rotary seal comprising an annular protrusion on the at least one nozzle and a complementary annular groove on the housing which define a seal path, the seal path including at least one direction change to prevent ingress of food material, and the rotary seal having a connection which prevents axial movement while still allowing rotary movement of the at least one nozzle with respect to the housing.

2. The rotary drive nozzle die machine of claim 1 wherein the at least one nozzle includes at least three openings for extruding at least three strands of food material which are spiral wound together into a single stream.

3. A The rotary drive nozzle die machine of claim 1 wherein two additional seals are provided to prevent food material from entering the drive assembly.

* * * * *